E. H. McHENRY.
SOLAR HEAT MOTOR.
APPLICATION FILED MAY 17, 1909.

984,585.

Patented Feb. 21, 1911.

Inventor
Edwin H. McHenry
By
Sturtevant & Mason
Attorneys

Witnesses
C. H. Walker
J. C. Baughman

UNITED STATES PATENT OFFICE.

EDWIN H. McHENRY, OF NEW HAVEN, CONNECTICUT.

SOLAR-HEAT MOTOR.

984,585.

Specification of Letters Patent.

Patented Feb. 21, 1911.

Application filed May 17, 1909. Serial No. 496,599.

*To all whom it may concern:*

Be it known that I, EDWIN H. McHENRY, a citizen of the United States, residing at New Haven, in the county of New Haven, State of Connecticut, have invented certain new and useful Improvements in Solar-Heat Motors, of which the following is a description, reference being had to the accompanying drawing and to the letters and figures of reference marked thereon.

The invention relates to new and useful improvements in motors, designed to be operated by atmospheric and solar heat.

An object of the invention is to provide a motor wherein air is used for the absorption and transfer of solar and atmospheric heat to the boiler in a condensing engine cycle.

A further object of the invention is to provide a device of the above character with means for superheating the air by exposure to solar radiation.

A further object of the invention is to provide a device of the above character with means for supplying the air with water vapor.

A further object of the invention is to provide a solar motor with a condenser, wherein an air blast is used in connection with an absorbent surface supplied with water.

These and other objects will in part be obvious, and will in part be hereinafter more fully described.

Figure 1:
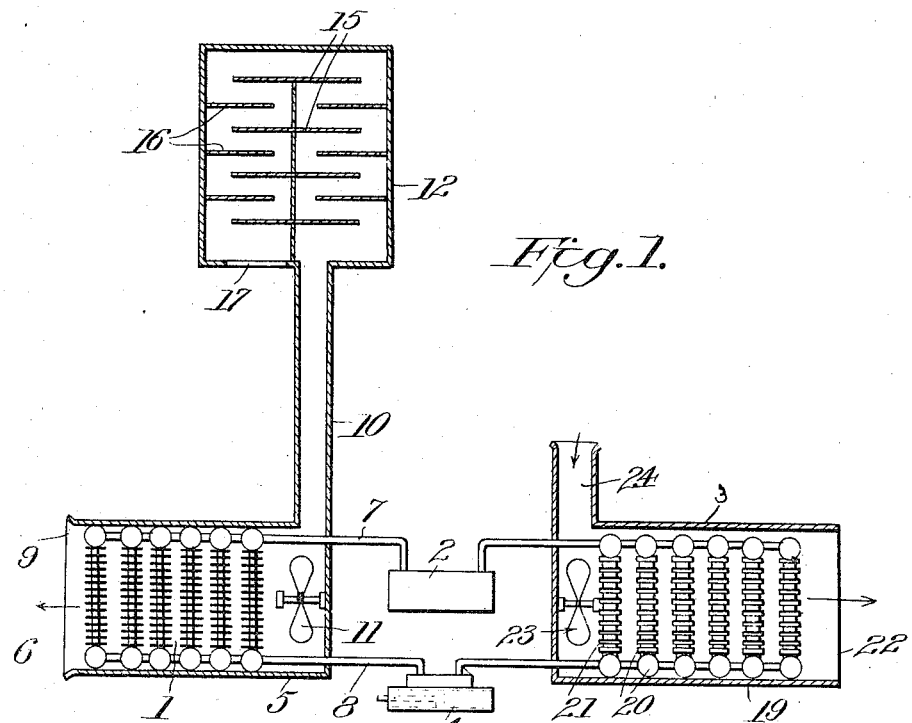
Figure 2:
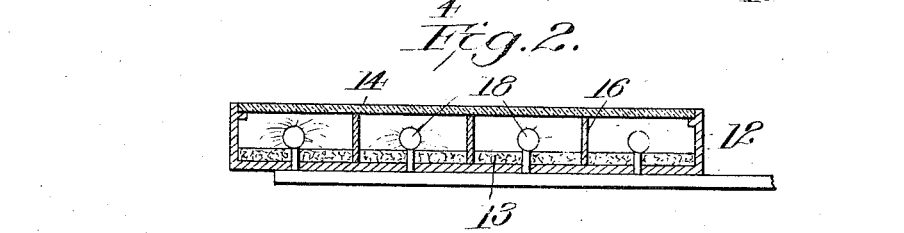
Figure 4:
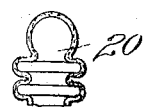
Figure 3:
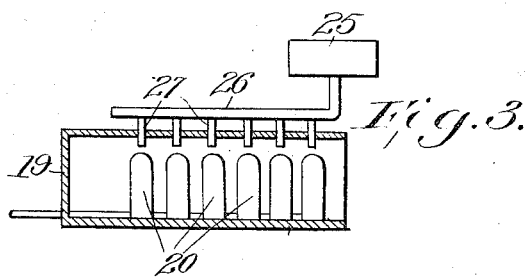

In the drawings which show to a large extent diagrammatically one embodiment of my invention,—Figure 1 is a horizontal sectional view through the essential parts of my motor; Fig. 2 is a sectional view through the heat collector and intensifier; Fig. 3 is a vertical section through the condenser; and Fig. 4 is an enlarged view, showing the absorbent material on the pipes of the condenser.

In carrying out my invention, a vaporizer or boiler 1 is provided, and the steam or vapor generated therein is led to an engine 2. The engine 2 may be of any desired condensing type, although I prefer to use the turbine type. The exhaust from the engine is led to a condenser 3, and the condensed vapors are fed by means of a pump 4 back to the boiler 1. This, of course, is the usual condensing engine cycle.

The vaporizer or boiler 1 consists, as herein shown, of an outer casing 5, in which are located water tubes 6. These water tubes 6 are preferably provided with fluted flanges to increase the surface of contact with the heating medium. A feed pipe 7 leads to the engine 2, and a return pipe 8 extends from the pump to the boiler. The casing 5 for the boiler is open at the end 9, and at its other end is connected with a pipe 10. At the inner end of the casing 5 is a fan 11, which may be operated in any suitable way. The fan 11 is so constructed as to force the heating medium through the tubular boiler or vaporizer, and cause the liquid contained in the vaporizer to be heated.

In order to heat the liquid in the boiler, I may force air therethrough, which is at normal atmospheric temperature, but I prefer to provide means for preheating the air before it is fed to the boiler or vaporizer. As herein shown, I have provided a heat collector or intensifier 12, which is substantially rectangular in form and at its bottom has any suitable non-conducting lining 13, while said collector has a glass covering 14. In place of the glass covering 14 I may, if desired, use a metal covering.

The collector is divided centrally by means of partitions 15, and with spaced projecting cross partitions 16, which overlap, so as to provide a passage leading back and forth through the collector for the air. The air is led to the heat collector by means of a suitable opening 17, and is conveyed from the heat collector to the pipe 10. It will be evident that as the heat collector or intensifier is exposed to the solar heat, the air passing in through the opening 17, by reason of the circulation established by the fan 11 will be preheated, so that as the said air is brought to the vaporizer or boiler, the heating effect of the air has been greatly increased.

It is well known that air has a very low specific capacity for heat, and that if water vapor is added thereto, the heat energy per cubic foot of the mixture of air and water vapor will be greatly augmented by the latent heat of the vapor. I preferably, therefore, provide the heat collector or intensifier with means for supplying the heated air with water vapor. As herein shown, I have provided a series of spray nozzles 18, which are located in the heat collector, and as the air passes over the same, the evaporation of the water will charge the air with water vapor. In place of the spray nozzles, any other desired means may be used for supplying the heat collector with water.

The operation of my device as above described, will be obvious. The vaporizer or boiler is supplied with a suitable liquid, which may be water, carbonic dioxid, sulfurdioxid, ammonia or any other similar condensable gas. The fan 11 will cause the air to circulate through the boiler and the liquid contained therein will be vaporized and led to the engine. The air for heating the boiler will be charged with a water vapor and preheated as it passes through the ducts of the heat collector or intensifier. The exhaust from the engine is led to the condenser 3, which, as herein shown, comprises an outer casing 19, in which are located a plurality of water tubes 20. The water tubes 20 are preferably provided with fluted flanges to increase the surface of contact with the air. The tubes 20 are also preferably coated with an absorbent material 21. The end 22 of the casing 19 is left open, and at the other end of the casing is located a fan 24 for causing a circulation of air through the condenser. The inner end of the casing 19 has a tube 24, through which air may be supplied. A reservoir 25 is connected to a pipe 26, which has a series of short pipes 27 leading to the inner side of the casing 19. Through the reservoir 25 water may be supplied to the condenser, and through the evaporation of the water the efficiency of the condenser is greatly increased. After the exhaust vapor from the engine has been condensed, it is fed back to the boiler or vaporizer by means of the pump 4.

If desired, with my heat collector or intensifier, any form of condenser may be used. While, on the other hand, with my air cooled condenser in connection with the evaporation of water, I may use air at atmospheric temperature in the vaporizer, and omit my heat collector, I prefer to use the form of condenser above described, in connection with my improved heat collector or intensifier, for I am thereby able to create a greater difference of temperature and pressure between the vaporizer and condenser, and thus increase materially the efficiency of the engine.

I do not claim herein the method of converting solar heat energy into motive power, except as the method is inherent in the apparatus described and pointed out in the appended claims. The broad method of heating a liquid in a vaporizer by solar heated air, which is superheated by being passed through a solar heat collector, and expanding said heating liquid in a condensing engine, forms the subject of my application, Serial No. 535,048, filed December 27th, 1909.

Having thus described my invention, what I claim as new and desire to secure by Letters Patent, is:—

1. The combination of a vaporizer, of a solar heat collector connected to said vaporizer, and means for causing air to circulate through the collector and vaporizer.

2. The combination of a vaporizer, of a solar heat collector connected to said vaporizer, means for causing air to circulate through the collector and vaporizer, and means for supplying the air as it is heated with water vapor.

3. The combination of a vaporizer, including tubes in which a liquid may be vaporized, a casing surrounding said tubes, a heat collector including a casing having a covering of heat-transmitting material, and having a passage through which air may circulate and be solar heated, a pipe connecting said vaporizer casing with the heat collector, and means for causing the air to circulate through the heat collector and about the tubes in the vaporizer.

4. The combination of a vaporizer, including tubes in which a liquid may be vaporized, a casing surrounding said tubes, a heat collector including a casing having a covering of heat-transmitting material and having a passage through which air may circulate and be solar heated, a pipe connecting said vaporizer casing with the heat collector, means for causing the air to circulate through the heat collector and about the tubes in the vaporizer, and means for supplying the air as it is heated with water vapor.

5. The combination of a vaporizer, a solar heat collector, including a covering of heat transmitting material, a bottom portion having a non-heat conducting lining, a pipe connecting said collector with the vaporizer, and means for causing air to circulate through the heat collector and the vaporizer.

6. The combination of a vaporizer, a solar heat collector including a covering of heat transmitting material, a bottom portion having a non-heat conducting lining, a pipe connecting said collector with the vaporizer, means in said collector for supplying the air as it is heated with water vapor and means for causing the air to circulate through the heat collector and the vaporizer.

7. The combination of a vaporizer, an engine, a condenser and a pump connected in a cycle, of a heat collector provided with air ducts connected to said vaporizer, and means for causing air to circulate through said heat collector and vaporizer.

8. The combination of a vaporizer, an engine, a condenser, and a pump connected in a cycle, of a heat collector provided with air ducts connected to said vaporizer, means for causing air to circulate through said heat collector and vaporizer, and means for supplying water vapor to the air as it is heated.

9. The combination of a vaporizer, including tubes in which a liquid may be vaporized, a casing extending about said tubes, means for causing solar-heated air to circulate through said casing and about said tubes to vaporize the liquid therein, an engine connected directly to said vaporizer tubes, a condenser connected to said engine, and a pump and connections for returning the liquid in the condenser to the tubes in the vaporizer.

10. The combination of a vaporizer, an engine, a condenser and a pump connected in a cycle, a heat collector, a pipe connecting said heat collector with said vaporizer, means for causing air to circulate through said heat collector and said vaporizer, said condenser including condensing pipes, means for supplying the outer surfaces of the said pipes with water, and means for forcing air around said pipes for evaporating the water and cooling the condensing pipes.

11. The combination of a vaporizer, an engine, a condenser and a pump connected in a cycle, means for causing solar heated air to circulate through said vaporizer, said condenser including condensing pipes, means for supplying the outer surface of said pipes with water, and means for forcing air around said pipes for evaporating said water and cooling the pipes of the condenser.

In testimony whereof I affix my signature, in presence of two witnesses.

EDWIN H. McHENRY.

Witnesses:
E. G. MASON,
C. L. STURTEVANT.